United States Patent [19]

Thomas

[11] 3,818,866
[45] June 25, 1974

[54] MILKER

[75] Inventor: Chester A. Thomas, Lake Forest, Ill.

[73] Assignee: Babso Bros. Co., Oak Brook, Ill.

[22] Filed: Nov. 10, 1969

[21] Appl. No.: 875,500

Related U.S. Application Data

[62] Division of Ser. No. 663,642, Aug. 28, 1967, abandoned.

[52] U.S. Cl. .............................. 119/14.1, 119/14.12
[51] Int. Cl. ............................................... A01j 9/08
[58] Field of Search ... 119/14.1–14.13, 14.45, 14.12

[56] References Cited
UNITED STATES PATENTS
2,497,299  2/1950  Daily ............................... 119/14.13
2,893,350  7/1959  Bouma ............................. 119/14.12

*Primary Examiner*—Hugh R. Chamblee
*Attorney, Agent, or Firm*—Hofgren, Wegner, Allen, Stellman & McCord

[57] ABSTRACT

A milker unit for a carry-away milking system with a milk receiving chamber beneath the cow, having a height to accommodate low udders. The chamber has a lid to which the teat cups are connected, the chamber tapering inwardly toward the bottom to a base. The overall height of the chamber is approximately 5¼ inches. Two forms of milker are shown. One, mounted on the stall structure, is carried in a cantilever arm having a downwardly extending portion connected with the lower part of the chamber through a rocker connector permitting limited movement about an axis parallel with the length of the cow being milked. In the other form, carried from a surcingle during milking, the milker includes a stand for supporting the apparatus on a surface when not in use. The stand has a movable leg which is adjustable between an extended support position with the teat cups above the surface and a retracted milking position in which the height of the milker is minimized.

4 Claims, 10 Drawing Figures

PATENTED JUN 25 1974  3,818,866

INVENTOR
CHESTER A. THOMAS

BY Hofgren, Wegner, Allen,
Stellman & McCord

ATTORNEYS.

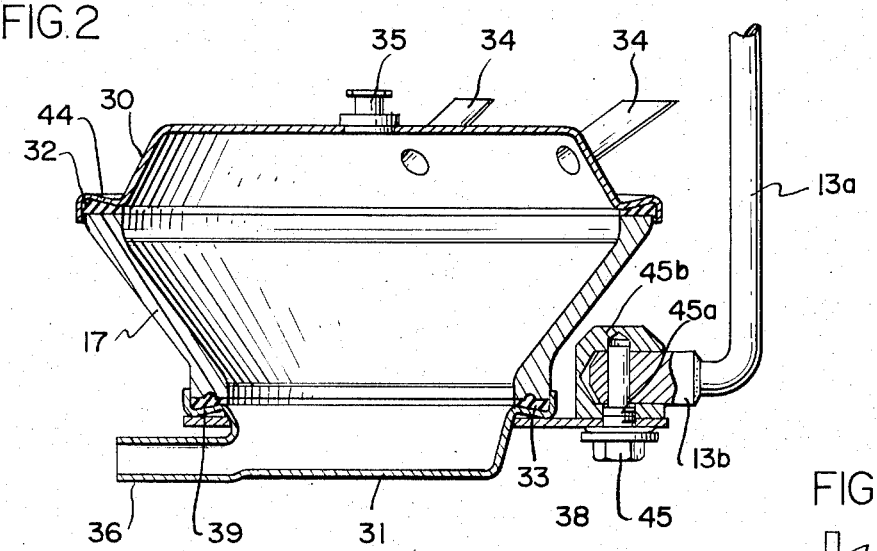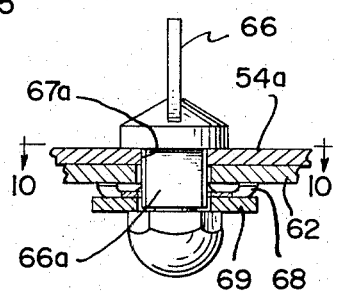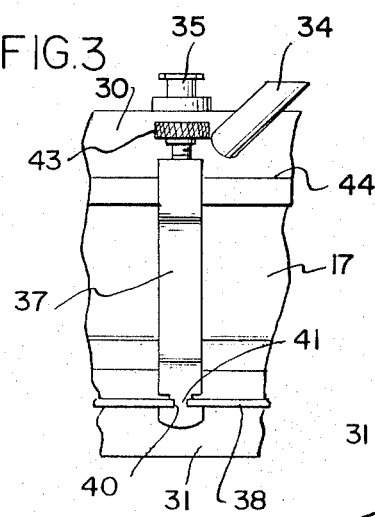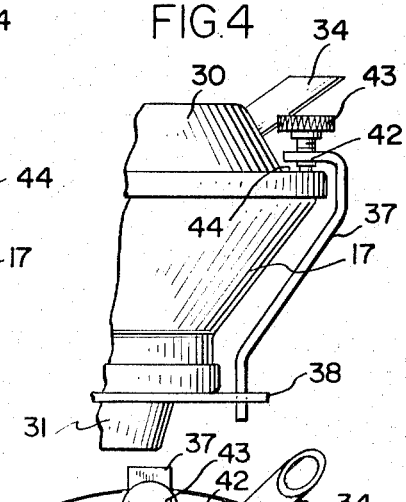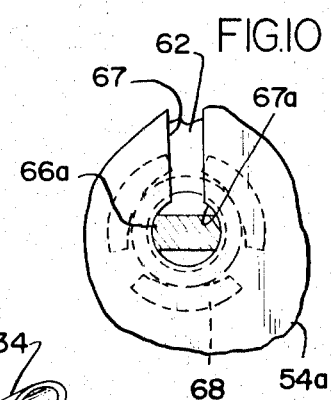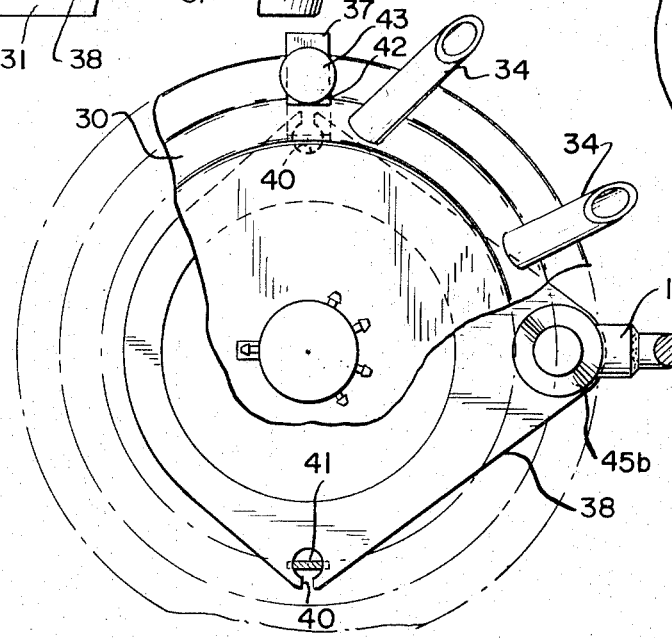

PATENTED JUN 25 1974 3,818,866

MILKER

This application is a division of copending Thomas application Ser. No. 663,642, filed Aug. 28, 1967, now abandoned and assigned to the assignee of this invention.

This invention relates to a milker unit for a carry-away milking system.

In a carry-away milking system, it is desirable to have the teat cups connected directly with a receiver which receives the milk and allows it to separate from the inflation stems so that there is no back-flow of milk as the inflations open. The milk flows smoothly from the receiver through a hose to an evacuated pipe line. As pointed out in Thomas U.S. Pat. No. 2,709,416, the chamber should have a capacity sufficient to hold all of the milk delivered by the cow in a single pulsation; at least a pint and preferably of the order of a quart or a quart and a half. Various commercial forms of the milker are illustrated in Thomas U.S. Pat. No. 2,783,737 and Merritt, et al., U.S. Pat. No. 2,831,456.

An increasing number of dairy cows have large udders, with widely spaced teats or with little clearance above the ground. It is necessary for some cows to be milked two teats at a time; and others must stand on planks during milking to raise the udder far enough to accommodate the milker.

The lid of the milker disclosed herein has a size and nipple placement which facilitates the connection of the teat cups to widely spaced or irregularly located teats. The bowl, which defines the body of the receiver, is a truncated cone. The relationship of the lid and base diameters and the chamber height provide the desired bowl capacity with a small over-all vertical dimension which permits milking low uddered cows.

In accordance with the foregoing, one feature of the invention is that the receiver includes a bowl having a lid portion connected with the teat cup assemblies and a base portion connected with the carry-away milk line, the lid being of the order of two times the diameter of the base and of the order of one and one-half times the vertical spacing between the lid and base. These relationships provide the necessary receiver capacity with low over-all height, and permit the location of the teat cups so that they may be connected with widely spaced teats.

Another feature is that the milk receiver has a wall portion with a longitudinal axis and an end closure, the wall portion having an end face in a plane at right angles to the axis and the end closure having a surface opposing the end face and diverging outwardly therefrom. A gasket between the end face of the wall and the surface of the closure has a tapered cross-section.

A further feature is that the base, bowl and lid are held together by tie straps having key portions attached to keyhole slots in a mounting plate on the base and with thumb screws in engagement with a peripheral surface of the lid.

And a further feature is that a milker unit to be carried from a surcingle has a stand for supporting the receiver on a surface with the teat cup assemblies spaced from the surface, the stand including a movable leg which is adjustable between an extended support position and a retracted milking position, the over-all height of the unit being minimized during milking by retracting the leg.

Further features and advantages of the invention will readily be apparent from the following specification and from the drawings, in which:

FIG. 2 is a vertical section through the milker unit of FIG. 1;

FIG. 3 is a fragmentary elevation of the milker unit;

FIG. 4 is a fragmentary elevation taken at right angles to FIG. 3;

FIG. 5 is a broken plan view;

FIG. 9 is a fragmentary section along line 9—9 of FIG. 7; and

FIG. 10 is a fragmentary section along line 10—10 of FIG. 9.

Substantially all carry-away milking operations in the United States are carried on either in a milking parlor or in a stanchion barn. Carry-away milking systems for the two types of milking operations have many similarities, but also require some differences in equipment. Some of the features disclosed and claimed herein may be used with either type of equipment while other features are particularly adapted for one system or the other. In a parlor milking system the milker units are commonly mounted from a supporting structure secured to the stall. In a stanchion barn, the milker is hung by a handle from a bail supported by a surcingle over the cow's back.

Figure 1:
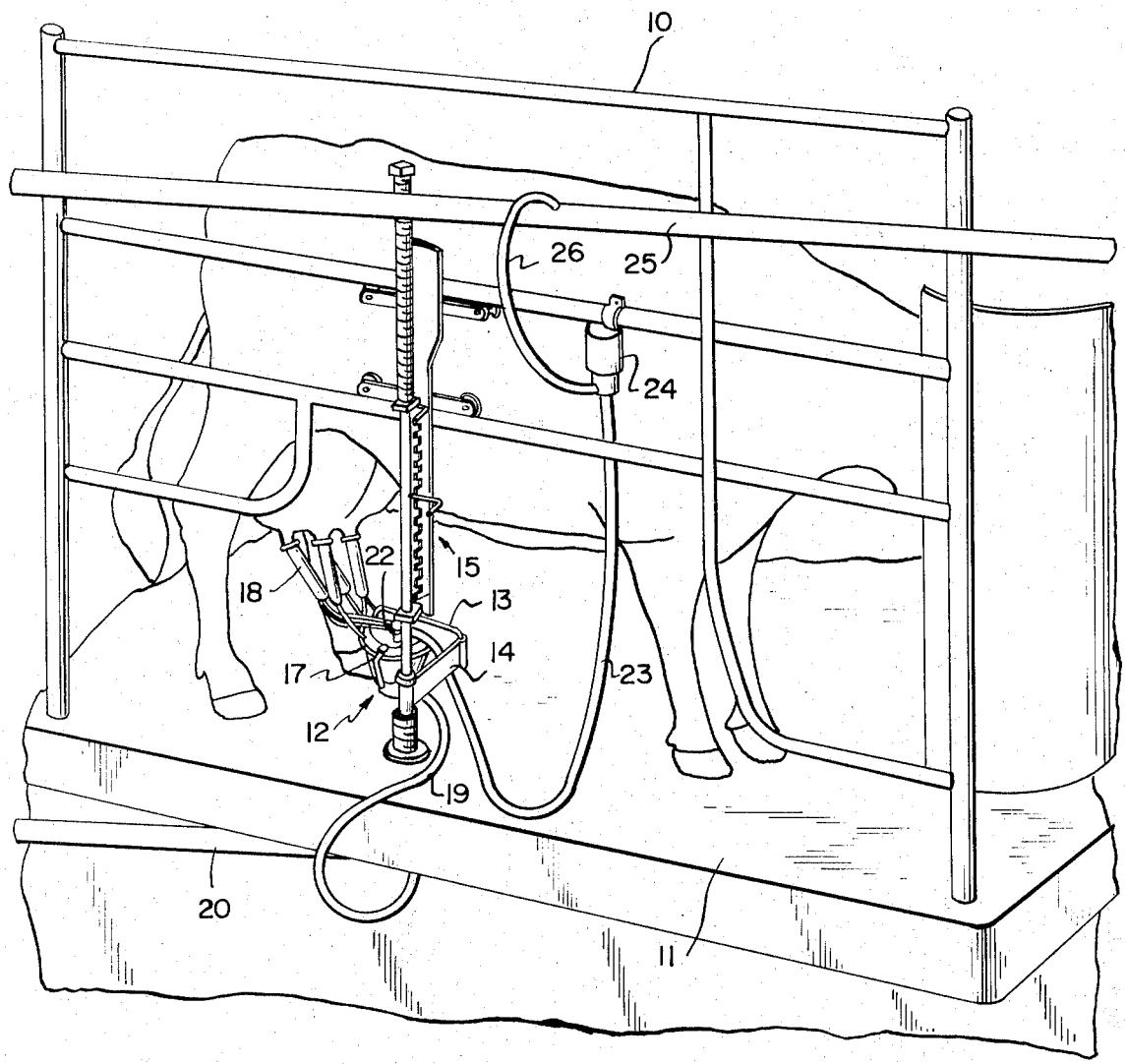
FIG. 1 is a perspective view of a parlor stall showing a cow being milked with an apparatus embodying the invention.

In FIG. 1 a cow is shown being milked in a parlor stall 10 mounted on a platform 11 spaced above an operator's alley (not shown). The milker unit 12 is carried by an arm 13 which extends lengthwise of the stall and is in turn carried by a transverse arm 14, part of an adjustable milker support 15 mounted on the stall. The support is adjustable vertically and rotationally to permit the application of downward and forward tug and pull through the milker unit to the cow's teats. Further details of the construction and operation of the support may be found in Babson U.S. Pat. No. 3,033,161.

Milker unit 12 includes a bowl assembly 17 having a lid with four teat cups 18 connected thereto and a milk hose 19 connected from the bottom to an evacuated carry-away milk pipe line 20. The teat cups 18 each include a rigid outer shell and a flexible liner or inflation. The shells are connected with a pulsator 22 on the lid of bowl 17 which in turn is connected through hose 23 with a pulsator control valve 24 electrically connected with a source of pulsation control signals (not shown). Vacuum for operating the pulsator is obtained from pipe line 25 through hose 26. In a double action milking system the interiors of the inflations are continuously evacuated through their connection with the evacuated milk pipe line 20. The spaces between the shells and the inflations are alternately evacuated and vented to atmosphere by the pulsator. When the spaces are evacuated, the inflations are expanded and milk flows through the inflations and into bowl 17. When the spaces are vented to atmosphere, the inflations collapse squeezing the cow's teats, providing a massage and rest period.

Turning now to FIGS. 2 through 5, the bowl assembly will be described in more detail. Bowl 17 is preferably of a transparent material to permit observation of the milk flow. Lid 30 and base 31 are sealed to the bowl by gaskets 32, 33 forming a closed chamber. Four nipples 34 (two shown in FIG. 2) have the stems of the inflations connected thereto. A post 35 on the lid provides a mounting for pulsator 22. Base 31 has a forwardly extending nipple 36 for the connection with milk hose 19. (The terms front and rear or forwardly and rearwardly when used in describing the relationship of the milker structure are referred to the head and tail of the cow when the milker is in use.)

The parts of the bowl assembly are held together by a pair of tie bars 37 diametrically arranged on opposite sides of the bowl. A mounting plate 38 underlies the flange 39 of base 31 and has a pair of diametrically opposed keyhole slots 40 in which key portions 41 at the lower ends of the tie bars are received. The tie bars follow the generally conical configuration of the bowl and have inturned upper ends 42 in which are mounted thumb screws 43 which bear against the flange 44 of the lid.

Thomas U.S. Pat. No. 2,709,416 discusses the need for a milk receiving chamber of substantial size to which the inflations of the teat cups are directly connected. The chamber should have a capacity at least sufficient to hold all of the milk delivered at a single pulsation. This, of course, is a variable from cow to cow and from time to time with a particular cow. For a commercial unit used with a wide variety of cows, it has been found that the receiver should have a capacity of the order of 3 to 3½ pints. To permit proper placement of the nipples 32 so that the teat cups will reach all four teats of cows even with abnormally large udders, the lid 30 has an outer diameter of the order of 8 inches. The height of the lid and of the base is approximately 1¼ inches each. A bowl height of 2½ inches provides an overall unit height of the order of 5¼ inches. This is sufficiently shallow to fit beneath the udder of most cows. With the bowl having an inner diameter at the top of approximately 7 inches and an inner diameter at the bottom of approximately 4 inches, the entire bowl assembly has a capacity of approximately 2½ pints.

The gaskets 32 and 33 sealing the lid and base to the bowl 17 have a tapered cross-section to improve the seal. The end faces of the wall of bowl 17 are at right angles to the bowl axis. The confronting flange surfaces of the base and lid diverge from the bowl wall end faces so that they are spaced more widely at the outer edge of the bowl than at the inner edge. The gaskets have a similar tapered configuration and are narrower at the inside than at the outside. More specifically, gaskets in a preferred embodiment of the invention have a dimension of three thirty-seconds of an inch at the inner edge and taper outwardly at an angle of 8°. The gasket is approximately ½ inch wide, the ratio of thickness of the outer edge of the gasket to the inner edge is of the order of 1.3. The flange portions of the base and lid diverge from a plane normal to the axis along an angle of the order of 10°, 2° greater than the angle of the gaskets. The lid and base seal with the respective gaskets along the inner edge upon initial assembly. As the thumb screws 43 are tightened, the seal progresses outwardly across the gasket.

Milker support arm 13 has a downwardly extending portion 13a which terminates in a forwardly extending bearing 13b received in a socket 45b secured to the extension at the rear of mounting plate 38. Mounting screw 45 has a threaded portion 45a which is only long enough to secure the socket 45b to mounting plate 38. The remainder of the screw 45 is unthreaded and extends through an opening in bearing 13b holding the bearing within the socket. The hole in bearing 13b is slightly larger than screw 45 so that the milker unit is permitted to rock about the bearing. The limited freedom for rocking movement about the bearing 13b, along an axis parallel with the cow being milked, enhances the ability of the apparatus to accommodate cows with large udders and irregular nipple placement. However, the bowl 17 is not permitted to rock so far that its operation would be impaired, as by positioning one of the connector nipples 34 below the normal milk line level within the bowl.

Through the mounting arm 13 and its connection with the milker unit, a supporting apparatus 15 can be utilized to apply a downward-forward pull to the cow's teats. When the teat cups are disconnected from the cow, the milker bowl assembly is carried by the supporting arm with the teat cups spaced above floor 11.

Figure 6:
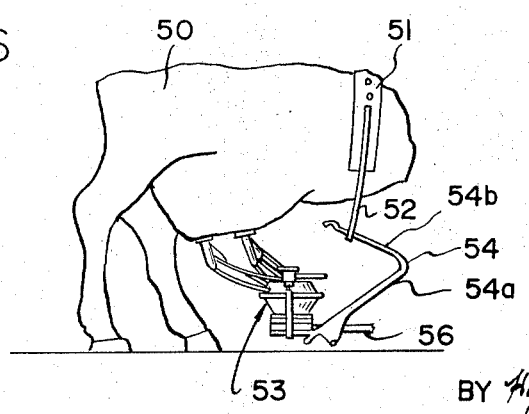
FIG. 6 is a reduced fragmentary elevation illustrating the surcingle milker unit.
Figure 7:
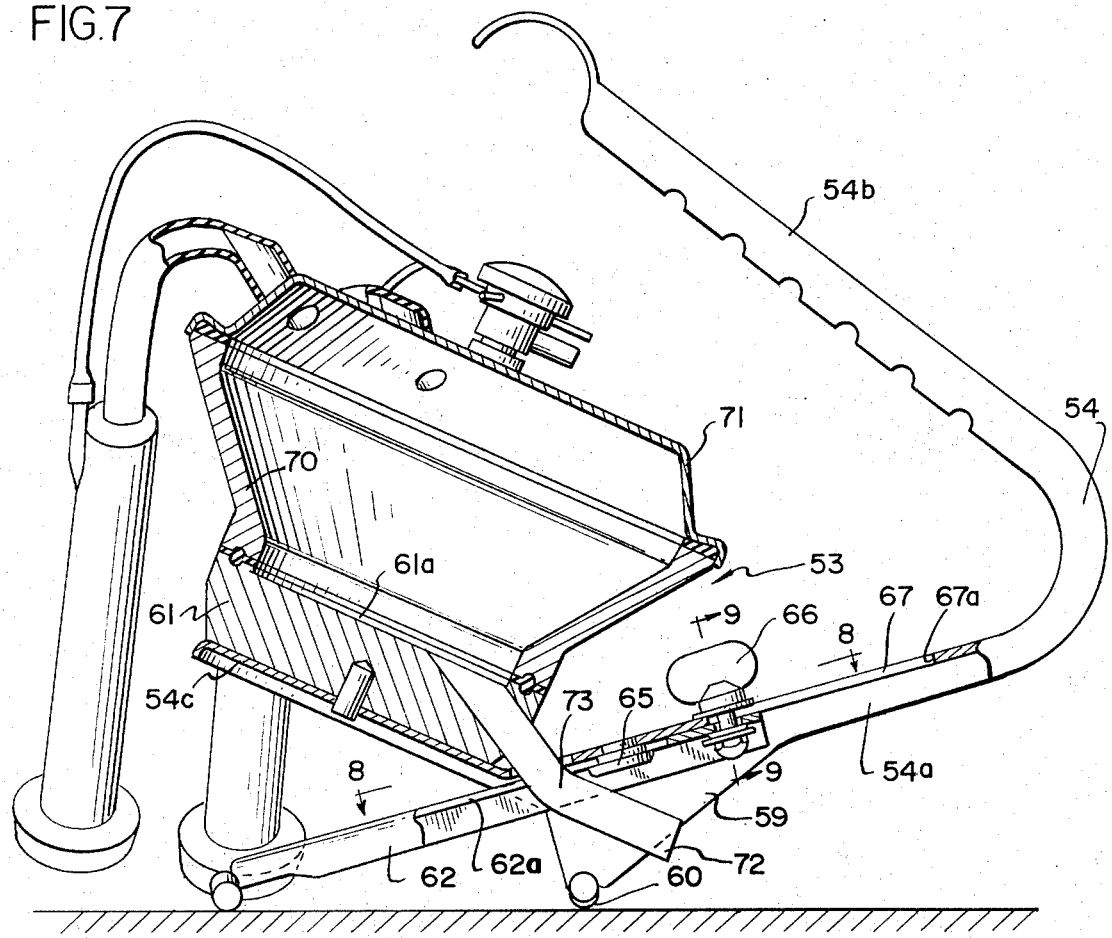
FIG. 7 is an elevation, partially in section, of the milker of FIG. 6.
Figure 8:
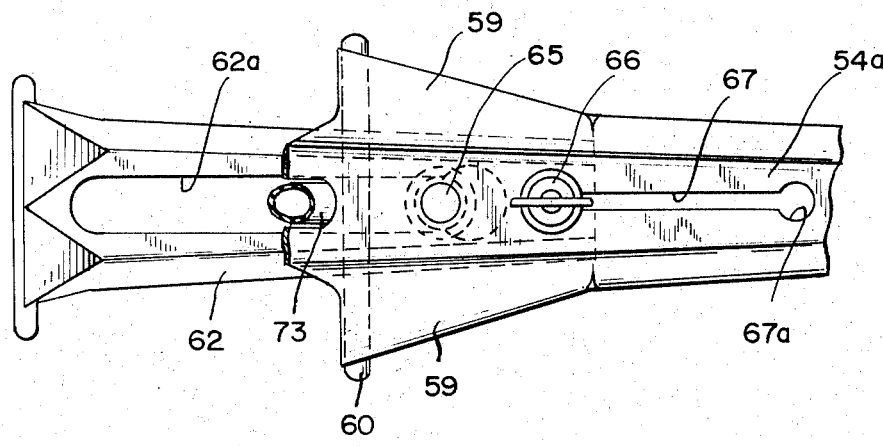
FIG. 8 is a section along line 8—8 of FIG. 7.

The surcingle milker unit is illustrated in FIGS. 6 through 8. Referring first to FIG. 6, the cow 50 has a surcingle strap 51 extending across its back and carrying between its lower ends a bail 52. The milker unit 53 has a handle 54 with a first portion 54a extending forwardly and upwardly from the base of the milker and a second portion 54b extending rearwardly and upwardly from the end of the first portion, terminating above the forward portion of the milker lid. Handle portion 54b has notches which permit positioning the milker with respect to bail 52 to apply the desired tug and pull to the cow's teats. A pulsator mounted on the lid of the milker is connected with the pulsator control (not shown) as in FIG. 1. A milk hose 56 is connected between the outlet of milker bowl 53 and an evacuated carry-away milk line (not shown).

The surcingle milker is provided with a stand by which it may be supported when it is not in use. Turning now to FIG. 7, it will be seen that handle portion 54a has downwardly extending wings 59 adjacent the lower front portion of the milker and on which is mounted an arched foot 60, below the bottom of milker base 61. The end 54c of handle portion 54a extends beneath base 61 and connects the milker with the handle. The stand includes a movable leg 62 secured to handle portion 54a and having an extended position illustrated in FIGS. 7 and 8 where it is located below and to the rear of foot 60. With movable leg 62 in its extended position, the milker has a tilted attitude with the teat cup units above the supporting surface. When the milker is hung on a surcingle beneath a cow, movable leg 62 may be retracted, FIG. 6, to accommodate low udders.

Extendable support leg 62 has a slot 62a therein which embraces a guide pin 65 secured to arm portion 54a. A thumb screw 66 is secured to leg 62 and slides in a slot 67 in leg portion 54a. As best seen in FIGS. 9 and 10, a spring washer 68 is captured between washer 69 and leg 62 and holds the leg tightly against the handle. Slot 67 has enlarged circular end portions, as 67a, and the shank 66a of the thumb screw has a noncircular cross-section so that it is retained in the slot end portions in one position and is slidable through the slot when rotated 90°. Thumb screw 66 may readily be turned and the leg adjusted between retracted and extended position with one hand while the milker is supported with the other.

The bowl 70 and lid 71 are identical with the bowl and lid of the previously described milker and will not be discussed in detail. Base 61, however is a solid member, as of stainless steel, to provide the weight necessary for tug and pull milking. In prior milkers the weight has been provided by a separate element secured to the bottom of a cup-like base, similar to the base used in the milker of FIGS. 1 through 5. This construction has unnecessarily increased the over-all height dimensions of the milker. By utilizing an integral base and weight, the height of the milker is minimized. The outlet nipple 72 extends transversely downwardly from the dished inner surface 61a of the base and is bent upwardly at 73 ending in a portion which extends through handle portion 54a and parallel with the bottom of base 61, above arched foot 60 so that connection may be made with milk hose 56 without requiring additional height.

I claim:

1. In a suspended milker having a milk receiver with improved stand, comprising:
   a fixed leg on the receiver, located below the receiver and at the front thereof; and
   a movable leg operably associated with the receiver having extended and retracted positions, the extended position being downwardly and rearwardly spaced from the fixed leg and below the teat cups, the milker being supported on a surface by the fixed leg and the movable leg in its extended position with the teat cups held in an elevated position above the supporting surface, the retracted position of the movable leg being at substantially the same level as that of the fixed leg to minimize the height of the milker for milking, wherein said milk receiver has a supporting handle with a portion extending upwardly and forwardly from the fixed leg and the movable leg is mounted on a plate slidable along said handle portion and including means securing the plate and handle together.

2. The milker of claim 1 in which a thumb screw extends through said handle and into said plate, said handle having a slot therein with circular end portions and said thumb screw having a noncircular shank movable through said slot in one position and trapped in an end portion in another position.

3. In a suspended milker having a milk receiver with teat cups connected to the upper rear portion thereof, an improved stand, comprising:
   a fixed leg on the receiver, located below the receiver and at the front thereof; and
   a movable leg operably associated with the receiver having extended and retracted positions, the extended position being downwardly and rearwardly spaced from the fixed leg and below the teat cups, the milker being supported on a surface by the fixed leg and the movable leg in its extended position with the teat cups held in an elevated position above the supporting surface, the retracted position of the movable leg being at substantially the same level as that of the fixed leg to minimize the height of the milker for milking, wherein each leg has an arched, transversely extending foot.

4. The milker of claim 1 having a mounting surface for said milk receiver extending rearwardly from the lower end of the upwardly extending portion of said handle, said milker including means securing said receiver on said surface.

* * * * *